US011645874B2

(12) United States Patent
Yin et al.

(10) Patent No.: US 11,645,874 B2
(45) Date of Patent: May 9, 2023

(54) VIDEO ACTION RECOGNITION AND MODIFICATION

(71) Applicant: INTERNATIONAL BUSINESS MACHINES CORPORATION, Armonk, NY (US)

(72) Inventors: Kun Yan Yin, Ningbo (CN); Hong Bing Zhang, BeiJIng (CN); Fan Li, Xianyang (CN); Hao Zhang, Shanghai (CN); Wang Xiao, NingBo (CN); Xue Ping Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 17/304,600

(22) Filed: Jun. 23, 2021

(65) Prior Publication Data
US 2022/0414367 A1 Dec. 29, 2022

(51) Int. Cl.
*G06K 9/00* (2022.01)
*G06V 40/20* (2022.01)
(Continued)

(52) U.S. Cl.
CPC .......... *G06V 40/23* (2022.01); *G06F 18/2163* (2023.01); *G06F 18/24* (2023.01); *G06N 3/04* (2013.01); *G06V 20/46* (2022.01)

(58) Field of Classification Search
CPC .... G06V 40/23; G06V 20/46; G06F 18/2163; G06F 18/24; G06N 3/04
See application file for complete search history.

(56) References Cited

U.S. PATENT DOCUMENTS 10,672,140 B2* 6/2020 Yu .............................. G06T 7/70
10,789,482 B2* 9/2020 Lan .......................... G06N 3/04
(Continued)

FOREIGN PATENT DOCUMENTS

CN 109325469 A 2/2019
CN 109583315 A 4/2019
(Continued)

OTHER PUBLICATIONS

Cho, Hyeoncheol et al.; Three-Dimensionally Embedded Graph Convolutional Network 3DGCN for Molecule Interpretation; arXiv: 1811.09794v4; Nov. 24, 2018 (V1), last revised Apr. 16, 2019; 39 pages.
(Continued)

*Primary Examiner* — Dhaval V Patel
(74) *Attorney, Agent, or Firm* — Schmeiser, Olsen & Watts, LLP; Christopher Pignato

(57) ABSTRACT

A system, method, and computer program product for implementing video action recognition is provided. The method includes receiving a video stream comprising user movement actions. Skeleton points associated with a video representation of a user executing the user movement actions are extracted and categorized with respect to multiple digital levels. Initial visual windows points are generated within video frames and an average movement distance for the group of skeleton points are determined with respect to the video frames. In response, sizes for the visual windows are adjusted and feature vectors are extracted from the group of skeleton points. Point coordinates of the skeleton points are extracted and linked with the feature vectors. A convolutional neural network associated with linking the feature vectors with the point coordinates is generated and the video stream is enabled with respect to video action recognition associated with accurate presentation of the video stream.

20 Claims, 8 Drawing Sheets

(51) Int. Cl.
  *G06N 3/04*   (2023.01)
  *G06V 20/40*  (2022.01)
  *G06F 18/24*  (2023.01)
  *G06F 18/21*  (2023.01)

(56) References Cited

U.S. PATENT DOCUMENTS

| | | | | |
|---|---|---|---|---|
| 2012/0327194 | A1* | 12/2012 | Shiratori | G06F 3/011 348/47 |
| 2015/0003687 | A1* | 1/2015 | Utsunomiya | G06V 40/25 382/107 |
| 2018/0322680 | A1 | 11/2018 | Mcelmurray et al. | |
| 2020/0184721 | A1 | 6/2020 | Ge et al. | |

FOREIGN PATENT DOCUMENTS

| | | |
|---|---|---|
| CN | 111259782 A | 6/2020 |
| CN | 111611895 A | 9/2020 |
| CN | 111814719 A | 10/2020 |
| CN | 112818942 A | 5/2021 |

OTHER PUBLICATIONS

Huang, Zhen et al.; Spatio-Temporal Inception Graph Convolutional Networks for Skeleton-Based Action Recognition; Proceedings of hte 28th ACM International Conference on Multimedia; Oct. 12, 2020; pp. 2122-2130.

Mell, Peter et al.; "The NIST Definition of Cloud Computing;" National Institute of Standards and Technology; Special Publication 800-145; Sep. 2011; 7 pages.

Wan, Bo et al.; Pose-aware Multi-level Feature Network for Human Object Interaction Detection; 2019 IEEE/CVF International Conference on Computer Vision; Oct. 26-Nov. 2, 2019; pp. 9,469-9478.

Zhang, Xikun et al.; Context Aware Graph Convolution for Skeleton-Based Action Recognition; 2020 IEEE/CVF Conference on Computer Vision and Pattern REcognition; Jun. 13-19, 2020; pp. 14333-14342.

PCT ISR and WO, International application No. PCT/CN2022/092187, International filing date Nov. 5, 2022, dated Oct. 8, 2022, 9 pages.

* cited by examiner

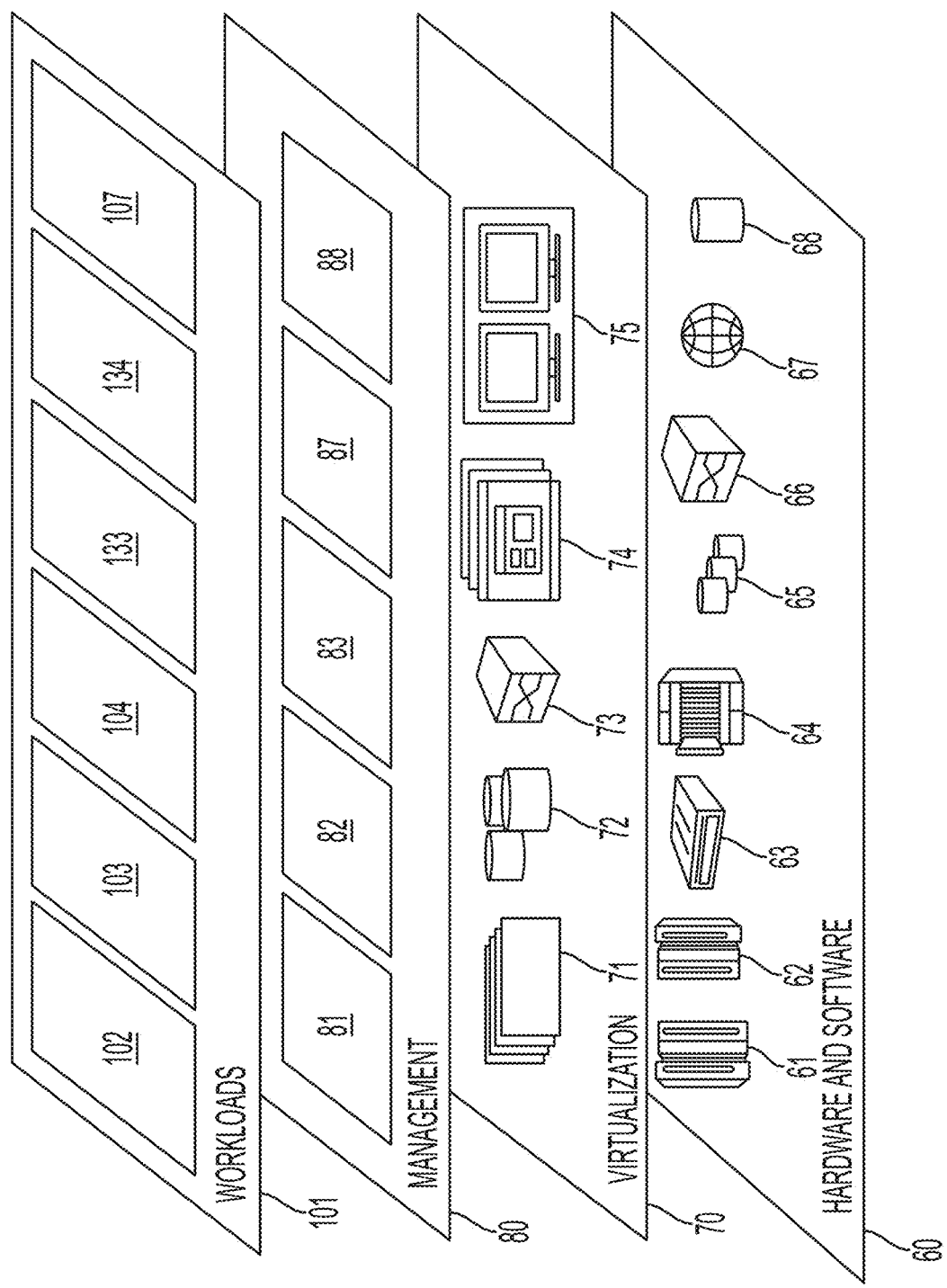

VIDEO ACTION RECOGNITION AND MODIFICATION

BACKGROUND

The present invention relates generally to a method for automating video action recognition and modification and in particular to a method and associated system for improving video and software technology associated with extracting from a video stream and categorizing, skeleton points associated with a video representation of a user executing user movement actions; generating initial visual windows surrounding a group of skeleton points; extracting and linking feature vectors with point coordinates; and enabling the video stream with respect to video action recognition associated with accurate presentation. Typical skeleton based graph convolutional networks associated with video action recognition such that a skeleton is first extracted based on Open pose processes. Likewise, spatial information based graph convolutional networks are extracted using location and confidence attributes such that extracted temporal information is based on time convolutional networks. Processes using location and confidence attributes may be prone to by passing information associated with the skeleton points. Additionally, typical video streams may be associated with differing level granularity actions thereby creating difficulty with representing an action based on a one-scale skeleton. Therefore, the method and associated system of the present invention is configured to enable a multi-granularity video action recognition process based on content aware and multiple-scale skeleton 3D-graph convolutional networks for improving an accuracy of recognition associated with multi-granularity video recognition actions.

SUMMARY

A first aspect of the invention provides a hardware device comprising a processor coupled to a computer-readable memory unit, the memory unit comprising instructions that when executed by the processor implements a video action recognition and modification method comprising: receiving, by the processor, a video stream comprising user movement actions; extracting, by the processor from the video stream via a plurality of sensors, skeleton points associated with a video representation of a user executing the user movement actions; categorizing, by the processor, the skeleton points with respect to multiple digital levels; generating, by the processor, initial visual windows surrounding a group of skeleton points of the skeleton points within a plurality of video frames of the video stream; determining, by the processor, an average movement distance for the group of skeleton points with respect to the plurality of video frames; adjusting, by the processor in response to results of the determining, sizes for the visual windows with respect to each of the plurality of video frames; extracting, by the processor executing scale-invariant feature transform (SIFT) code in response to results of the adjusting, feature vectors of the group of skeleton points; extracting, by the processor executing OpenPose code, point coordinates of the skeleton points; first linking, by the processor, the feature vectors with the point coordinates; generating, by the processor, a convolutional neural network associated with the linking the feature vectors with the point coordinates; and enabling, by the processor in response to results of enabling the convolutional neural network, the video stream with respect to video action recognition associated with accurate presentation of the video stream.

Some embodiments of the invention further provide a hardware device for extracting surrounding features associated with the skeleton points. Likewise, some embodiments of the invention are configured to categorizing and link the skeleton points with respect to multiple digital features to determine a classification probability associated with actions of the convolutional neural network. These embodiments advantageously provide an effective means for accurately enabling a multi-granularity video action recognition process based on content aware and multiple-scale skeleton 3D-graph convolutional networks for improving an accuracy of recognition associated with multi-granularity video recognition actions.

A second aspect of the invention provides a video action recognition and modification method comprising: receiving, by a processor of a hardware device, a video stream comprising user movement actions; extracting, by the processor from the video stream via a plurality of sensors, skeleton points associated with a video representation of a user executing the user movement actions; categorizing, by the processor, the skeleton points with respect to multiple digital levels; generating, by the processor, initial visual windows surrounding a group of skeleton points of the skeleton points within a plurality of video frames of the video stream; determining, by the processor, an average movement distance for the group of skeleton points with respect to the plurality of video frames; adjusting, by the processor in response to results of the determining, sizes for the visual windows with respect to each of the plurality of video frames; extracting, by the processor executing scale-invariant feature transform (SIFT) code in response to results of the adjusting, feature vectors of the group of skeleton points; extracting, by the processor executing OpenPose code, point coordinates of the skeleton points; first linking, by the processor, the feature vectors with the point coordinates; generating, by the processor, a convolutional neural network associated with the linking the feature vectors with the point coordinates; and enabling, by the processor in response to results of enabling the convolutional neural network, the video stream with respect to video action recognition associated with accurate presentation of the video stream.

Some embodiments of the invention further provide a process for extracting surrounding features associated with the skeleton points. Likewise, some embodiments of the invention are configured to categorizing and link the skeleton points with respect to multiple digital features to determine a classification probability associated with actions of the convolutional neural network. These embodiments advantageously provide an effective means for accurately enabling a multi-granularity video action recognition process based on content aware and multiple-scale skeleton 3D-graph convolutional networks for improving an accuracy of recognition associated with multi-granularity video recognition actions.

A third aspect of the invention provides computer program product, comprising a computer readable hardware storage device storing a computer readable program code, the computer readable program code comprising an algorithm that when executed by a processor of a hardware device implements a video action recognition and modification method, the method comprising: receiving, by the processor, a video stream comprising user movement actions; extracting, by the processor from the video stream via a plurality of sensors, skeleton points associated with a video representation of a user executing the user movement actions; categorizing, by the processor, the skeleton points with respect to multiple digital levels; generating, by the processor, initial visual windows surrounding a group of skeleton points of the skeleton points within a plurality of video frames of the video stream; determining, by the processor, an average movement distance for the group of skeleton points with respect to the plurality of video frames; adjusting, by the processor in response to results of the determining, sizes for the visual windows with respect to each of the plurality of video frames; extracting, by the processor executing scale-invariant feature transform (SIFT) code in response to results of the adjusting, feature vectors of the group of skeleton points; extracting, by the processor executing OpenPose code, point coordinates of the skeleton points; first linking, by the processor, the feature vectors with the point coordinates; generating, by the processor, a convolutional neural network associated with the linking the feature vectors with the point coordinates; and enabling, by the processor in response to results of enabling the convolutional neural network, the video stream with respect to video action recognition associated with accurate presentation of the video stream.

Some embodiments of the invention further provide a computer program product for extracting surrounding features associated with the skeleton points. Likewise, some embodiments of the invention are configured to categorizing and link the skeleton points with respect to multiple digital features to determine a classification probability associated with actions of the convolutional neural network. These embodiments advantageously provide an effective means for accurately enabling a multi-granularity video action recognition process based on content aware and multiple-scale skeleton 3D-graph convolutional networks for improving an accuracy of recognition associated with multi-granularity video recognition actions.

The present invention advantageously provides a simple method and associated system capable of automating video action recognition and modification.

BRIEF DESCRIPTION OF THE DRAWINGS

FIG. 8 illustrates a set of functional abstraction layers provided by cloud computing environment, in accordance with embodiments of the present invention.

DETAILED DESCRIPTION

Figure 1:
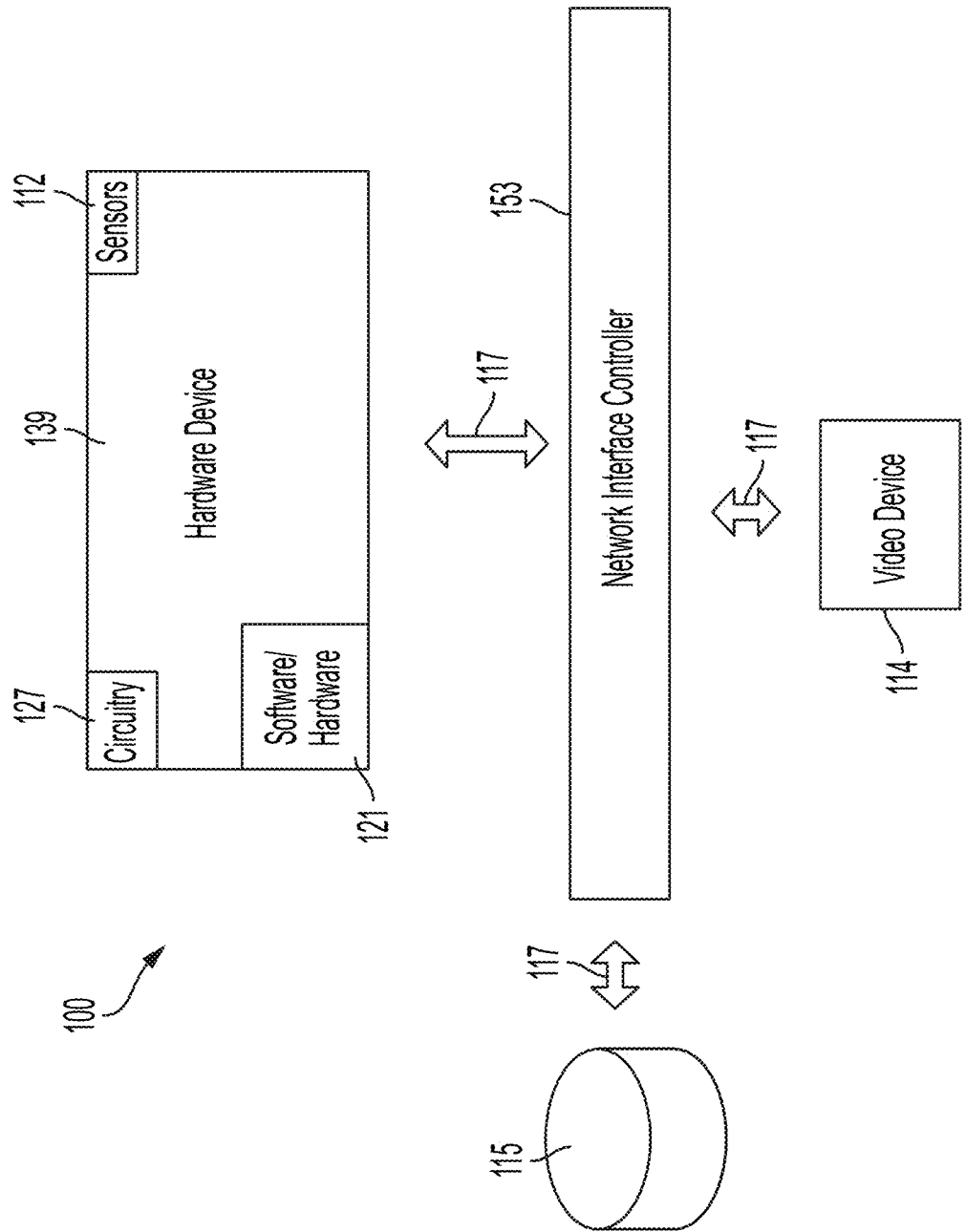
FIG. 1 illustrates a system for improving video and software technology associated with extracting from a video stream and categorizing, skeleton points associated with a video representation of a user executing user movement actions; generating initial visual windows surrounding a group of skeleton points; extracting and linking feature vectors with point coordinates; and enabling the video stream with respect to video action recognition associated with accurate presentation, in accordance with embodiments of the present invention.

FIG. 1 illustrates a system 100 for improving video and software technology associated with extracting from a video stream and categorizing, skeleton points associated with a video representation of a user executing user movement actions; generating initial visual windows surrounding a group of skeleton points; extracting and linking feature vectors with point coordinates; and enabling the video stream with respect to video action recognition associated with accurate presentation, in accordance with embodiments of the present invention. Typical skeleton based graph convolutional networks are associated with video action recognition such that a skeleton is first extracted. Likewise, typical spatial information based graph convolutional networks are extracted using location and confidence attributes such that extracted temporal information is based on time convolutional networks. Furthermore, processes using location and confidence attributes may be prone to by passing information associated with the skeleton points. Additionally, typical video streams may be associated with differing level granularity actions thereby creating difficulty with representing an action based on a one-scale skeleton. Therefore system 100 is configured to: recognize multi-granularity video actions, execute an adaptive surrounding features extraction process based on skeleton points, and enable multiple scale skeleton three dimensional graph convolution networks thereby improving an accuracy of recognition with respect to multi-granularity actions and provide an accurate method for extracting video recognition attributes.

System 100 enables retrieval of information associated with skeleton points with respect to image information such that differing scale associated skeleton points may be configured to represent differing granularity video actions. The video actions may be associated with a skeleton based three dimensional graph.

System 100 is configured to execute a multi-granularity video action recognition process based on content awareness with respect to multiple-scale skeleton three dimensional graph based convolutional networks. The process is initiated when a skeleton is extracted based on an OpenPose system (i.e., a real-time multi-person system jointly detecting human body, hand, facial, and foot key-points (e.g., a total 135 key-points) with respect to single images). Likewise, system 100 comprises a feature extractor component associated with skeleton points for constructing a three dimensional graph based on different scale skeleton attributes.

System 100 of FIG. 1 includes hardware device 139, video hardware 114, a database 115, and network interface controller interconnected through a network 7. Hardware device 139 comprises sensors 112, circuitry/logic 127, and software/hardware 121. Video hardware 114 may comprise a remote video source system (e.g., a video storage system, a video streaming system, a video projector, etc.). Hardware device 139 and video hardware 114 each may comprise an embedded device(s). An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, Hardware device 139 and video hardware 114 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-8. The specialized discrete non-generic analog, digital, and logic-based circuitry (e.g., sensors 112, circuitry/logic 127, software/hardware 121, etc.) may include proprietary specially designed components (e.g., a specialized integrated circuit, such as for example an Application Specific Integrated Circuit (ASIC) designed for only implementing an automated process for improving video and software technology associated with extracting from a video stream and categorizing, skeleton points associated with a video representation of a user executing user movement actions; generating initial visual windows surrounding a group of skeleton points; extracting and linking feature vectors with point coordinates; and enabling the video stream with respect to video action recognition associated with accurate presentation. Sensors 112 may include any type of internal or external sensors including, inter alia, GPS sensors, Bluetooth beaconing sensors, cellular telephone detection sensors, Wi-Fi positioning detection sensors, triangulation detection sensors, activity tracking sensors, a temperature sensor, an ultrasonic sensor, an optical sensor, a video retrieval device, humidity sensors, voltage sensors, network traffic sensors, etc. Network 7 may include any type of network including, inter alia, a local area network, (LAN), a wide area network (WAN), the Internet, a wireless network, etc.

System 100 is enabled to execute a process for extracting visual surrounding features by enabling adaptive surrounding feature extraction code with respect to a scale-invariant feature transform (SIFT) comprising a feature detection algorithm associated with computer vision for detecting and describing local features within images. The process includes:

1. Modifying an initial window size of 5 to extract video features.

2. Setting a frame strap size to 10 and determining an average moving distance for each skeleton point.

3. Using an associated distance to adjust a visual window size.

4. Using a SIFT related process for extracting box features with respect to a one-dimensional vector.

System 100 is further enabled to execute a process for implementing a multiple-scale skeleton three dimensional graph convolutional network modeling process as follows:

1. Three layers of skeletons are under-sampled based on an open pose extracted skeleton.

2. A three dimensional skeleton graph is generated.

3. A three dimensional graph convolutional network is executed to extract video features for each layer 4. Three dimensional graph convolutional network features are fused with an attention model with respect to differing layers.

Figure 2:
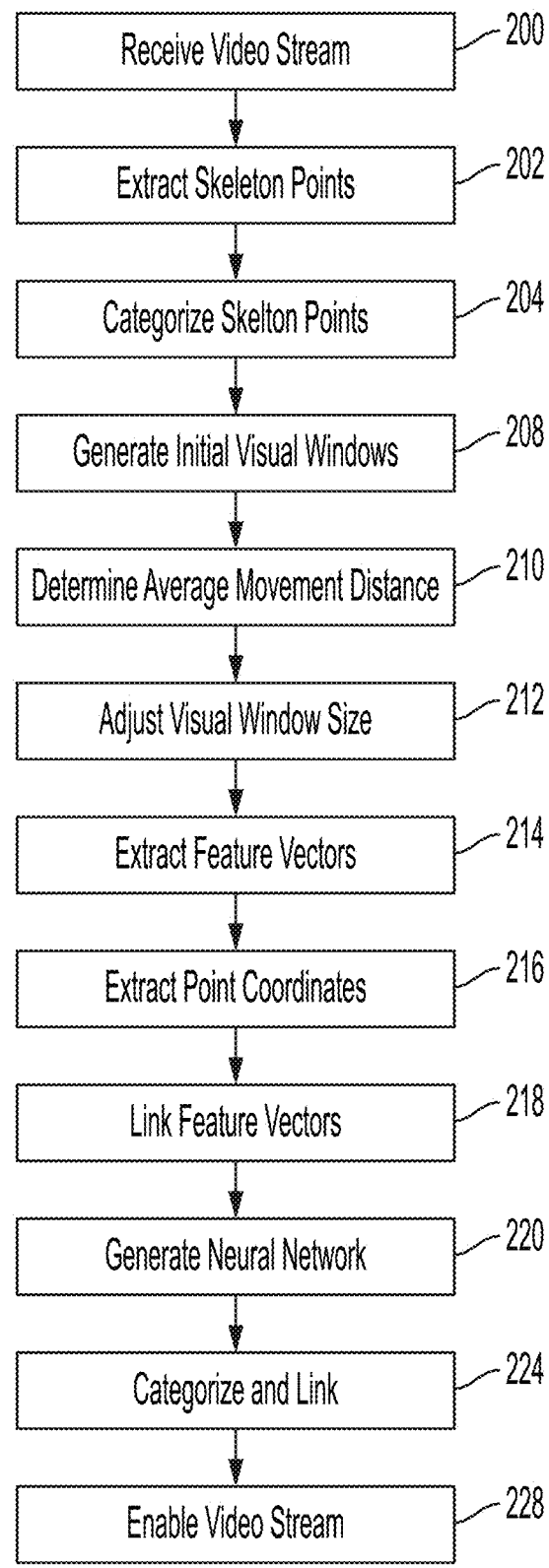
FIG. 2 illustrates an algorithm detailing a process flow enabled by the system of FIG. 1 for improving video and software technology associated with extracting from a video stream and categorizing, skeleton points associated with a video representation of a user executing user movement actions; generating initial visual windows surrounding a group of skeleton points; extracting and linking feature vectors with point coordinates; and enabling the video stream with respect to video action recognition associated with accurate presentation, in accordance with embodiments of the present invention.

FIG. 2 illustrates an algorithm detailing a process flow enabled by system 100 of FIG. 1 for improving video and software technology associated with extracting from a video stream and categorizing, skeleton points associated with a video representation of a user executing user movement actions; generating initial visual windows surrounding a group of skeleton points; extracting and linking feature vectors with point coordinates; and enabling the video stream with respect to video action recognition associated with accurate presentation, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by hardware device 139 and video hardware 114. In step 200, a video stream comprising user movement actions is received by a hardware device. In step 202, skeleton points are extracted from the video stream via sensors. The skeleton points are associated with a video representation of a user executing the user movement actions. In step 204, the skeleton points are categorized with respect to multiple digital levels. The skeleton points may be up sampled with respect to the multiple digital levels.

In step 208, initial visual windows surrounding a group of skeleton points are generated within video frames of the video stream. In step 210, an average movement distance for the skeleton points is determined with respect to the video frames. Likewise, surrounding features associated with the skeleton points may be extracted such that determining the average movement distance for the skeleton points is further based on the surrounding features. Determining the average movement distance may include executing the following equation:

$$r_w^i = \frac{1}{N}\sum_{k=i-4}^{i+5} dist(x^t, x^{t+1}),$$

where $r_w^i$ comprises a reshape factor for an original window width (W) of an ith frame, N comprises a number of frames for calculating a reshape factor, dist comprises a Euclid distance, and $x^t$ comprises x coordinates of skeleton points in a frame t. Additionally, determining the average movement distance may further include executing the following equation:

$$r_H^i = \frac{1}{N}\sum_{k=i-4}^{i+5} dist(y^t, y^{t+1}),$$

where $r^i$ comprises a reshape factor for an original window Height (H) of the ith frame, N comprises a number of frames for calculating the reshape factor, dist comprises a Euclid distance, and $y^t$ includes y coordinates of skeleton points in the frame t.

In step 212, sizes for the visual windows are adjusted (based on the results of step 210) with respect to each of the video frames. Adjusting the sizes for the visual windows may include executing the following equation:

$$W' = W \times \frac{1}{1 + e^{-r_w^i}},$$

where W' comprises a reshaped window width, W comprises an original window width, and $r_w^i$ comprises a reshape factor for the original window width W of an ith frame. Adjusting the sizes for the visual windows may further comprise executing the following equation:

$$H' = H \times \frac{1}{1 + e^{-r_H^i}},$$

where H' comprises a reshaped window height, where H comprises an original window height, and where $r_H^i$ comprises a reshape factor for the original window width H of the ith frame.

In step 214, feature vectors of the skeleton points are extracted via execution of scale-invariant feature transform (SIFT) code in response to results of step 212. In step 216, point coordinates of the skeleton points are extracted via execution of OpenPose code. In step 218, the feature vectors are linked with the point coordinates. In step 220, a convolutional (digital) neural network is generated. The convolutional (digital) neural network is associated with linking the feature vectors with the point coordinates. In step 224, the skeleton points are categorized and linked with respect to multiple digital features and a classification probability associated with actions of the convolutional neural network is determined in response to results of the aforementioned linking steps. Likewise, the skeleton points are categorized with respect to multiple digital features and the multiple digital features may be linked. Additionally, a classification probability associated with actions of the convolutional neural network may be determined based on the aforementioned linking steps.

In step 228, the video stream is enabled with respect to video action recognition associated with accurate presentation of the video stream.

Figure 3:
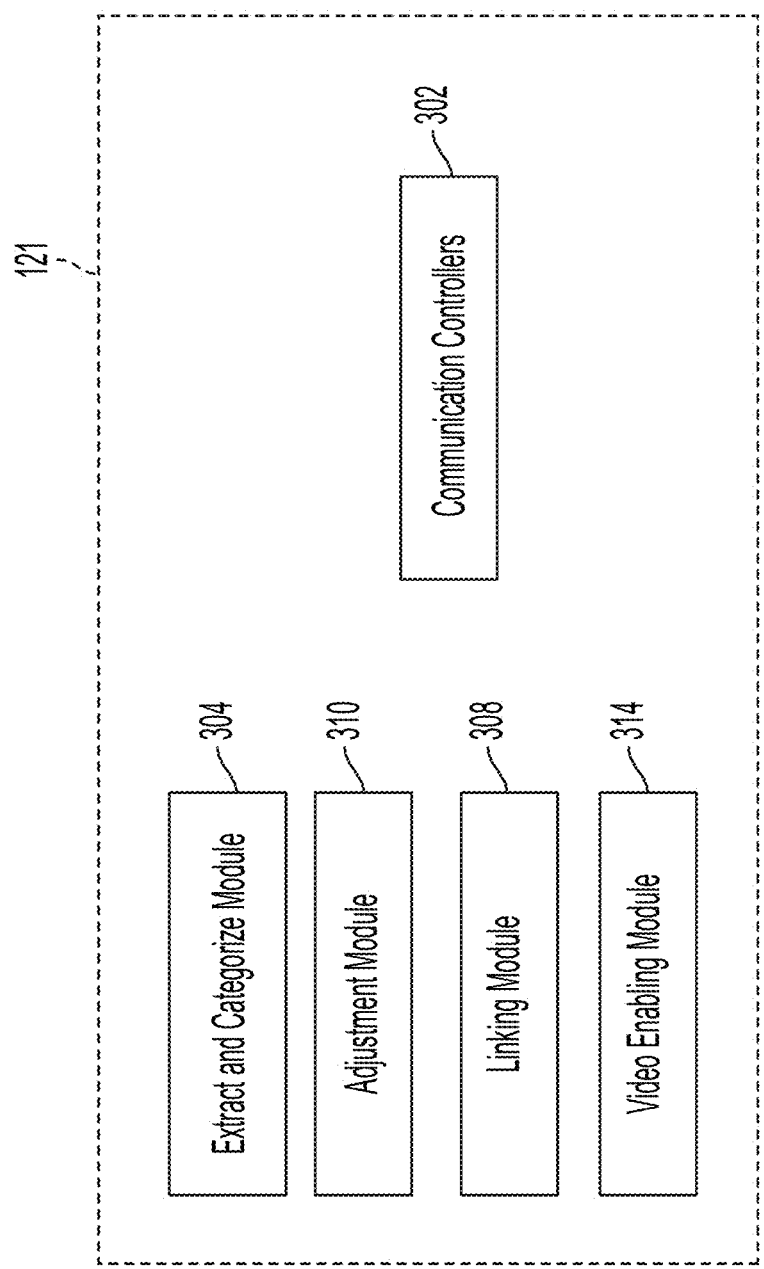
FIG. 3 illustrates an internal structural view of the software/hardware of FIG. 1, in accordance with embodiments of the present invention.

FIG. 3 illustrates an internal structural view of software/hardware 121 of FIG. 1, in accordance with embodiments of the present invention. Software/hardware 121 includes an extract and categorize module 304, an adjustment module 310, a linking module 308, a video enabling module 314, and communication controllers 302. Extract and categorize module 304 comprises specialized hardware and software for controlling all functions related to the extracting and categorizing steps of FIG. 2. Adjustment module 310 comprises specialized hardware and software for controlling all functionality related to the adjustment steps described with respect to the algorithm of FIG. 2. Linking module 308 comprises specialized hardware and software for controlling all functions related to the linking steps of FIG. 2. Video enabling module 314 comprises specialized hardware and software for controlling all functions related to the video stream enabling and presentation steps of the algorithm of FIG. 2. Communication controllers 302 are enabled for controlling all communications between extract and categorize module 304, adjustment module 310, linking module 308, and video enabling module 314.

Figure 4:
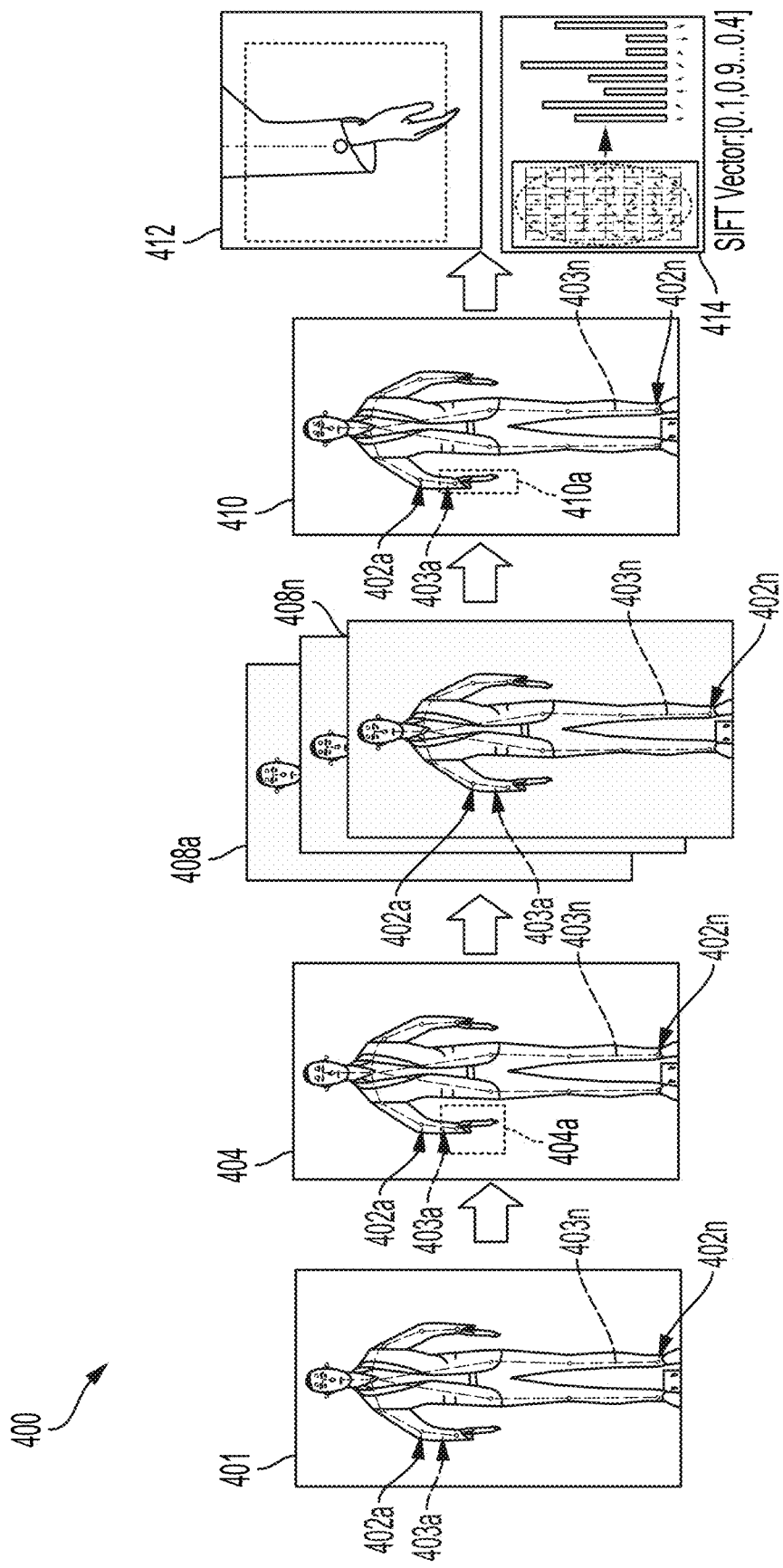
FIG. 4 illustrates an initial visual window generation process enabled by the system of FIG. 1, in accordance with embodiments of the present invention.

FIG. 4 illustrates an initial visual window generation process 400 enabled by system 100 of FIG. 1, in accordance with embodiments of the present invention. Frame 401 comprises a first sample frame comprising skeleton points 402a . . . 402n and connections 403a . . . 403n connecting skeleton points 402a . . . 402n. An OpenPose tool is executed for extracting skeleton points 402a . . . 402n for every frame. Frame 404 comprises a second sample frame comprising an original window 404a surrounding a group 404b of skeleton points 402a . . . 402n associated with extracting context features to represent skeleton points 402a . . . 402n. Frames 408a . . . 408n comprise frames associated with a process for determining reshape factors for a width and height of an original window. The process enables 10 frames surrounding a current frame for calculating a Euclid distance of current skeleton points (of skeleton points 402a . . . 402n) located between two concatenated frames. Likewise, an average Euclid distance among the 10 frames is determined to a reshape factor (as illustrated with respect to the equations described with respect to FIG. 2). Frame 410 comprises a sample frame associated with a process for reshaping an original window using the aforementioned reshape factor (as illustrated with respect to the equations described with respect to FIG. 2). Frames 412 and 414 comprise sample frames associated with a process for extracting context features using a SIFT algorithm with respect to skeleton points within window 404a. The process for extracting context features is executed for generating feature vectors for skeleton points within window 404a. The feature vectors are used for input data of a deep learning model.

Figure 5:
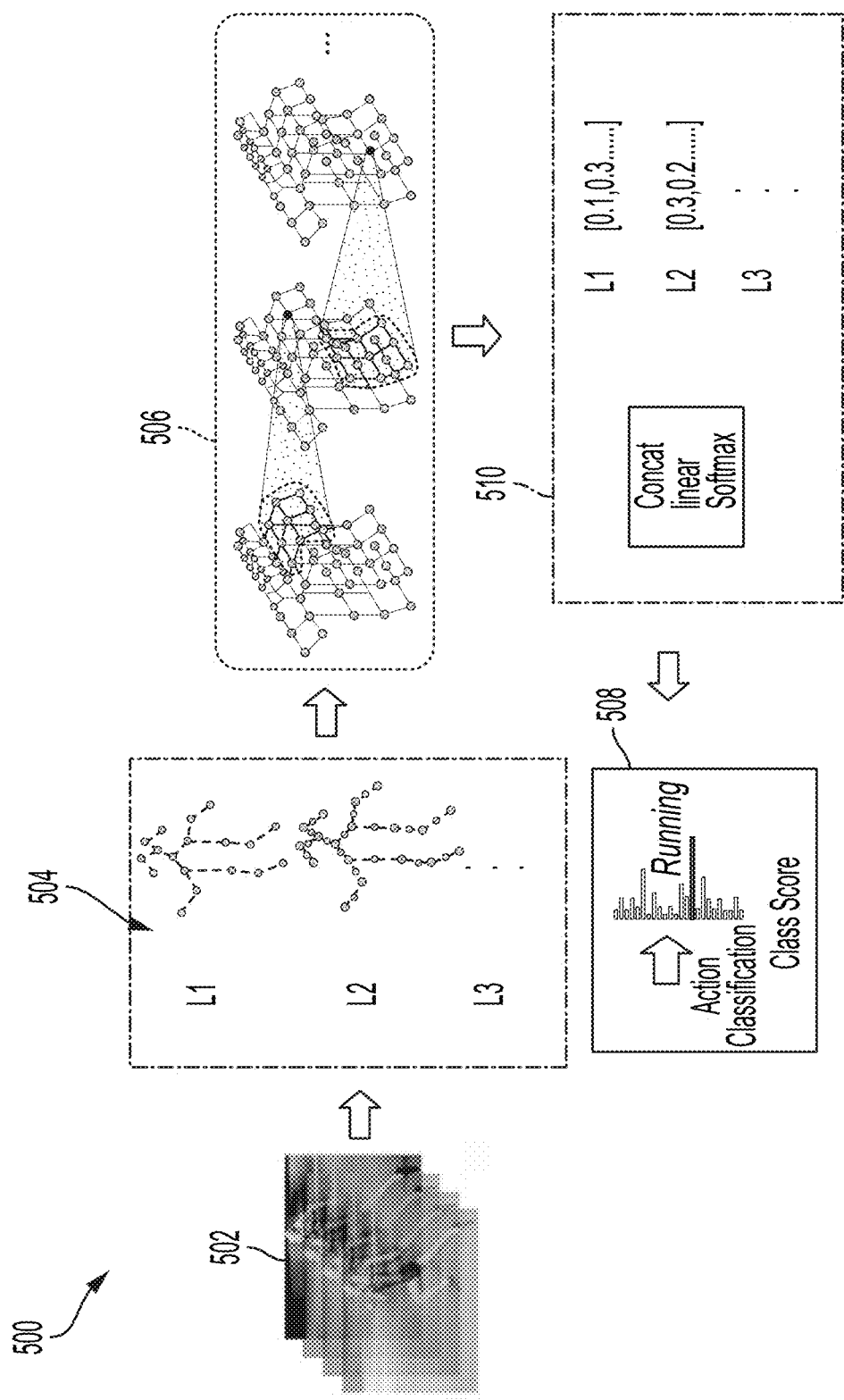
FIG. 5 illustrates a point coordinate extraction process enabled by the system of FIG. 1, in accordance with embodiments of the present invention.

FIG. 5 illustrates a point coordinate extraction process 500 enabled by system 100 of FIG. 1, in accordance with embodiments of the present invention. For each of frames 502, skeleton points are extracted via execution of an OpenPose tool. OpenPose tool is configured to extract 18 skeleton points for one person of frames 502. Block 504 illustrates skeleton points being down sampled to differing levels L1, L2, and L3 for retrieving more information from each of frames 502. For example, in level L2, a middle point for every two skeleton points is assigned as a skeleton point thereby enabling a process for extracting SIFT features around new skeleton points. Block 506 illustrates operation of a spatial-temporal graph convolutional network (ST-GCN) algorithm implemented via code execution thereby applying a deep neural network backbone with respect to a graph (vertex and edge) sequence instead of an image. Block 510 illustrates a process for feeding extracted SIFT features into a ST-GCN model such that one feature vector is retrieved for each skeleton point level. Therefore, all levels are configured to concatenate vectors into one large vector. Likewise, a linear layer is executed with respect to a neural network to reduce a vector dimension as same size as a number of action classes. Block 508 illustrates a SoftMax layer to transfer a float vector into a class probability such that a max probability within a final vector comprises a recognized action.

Figure 6:
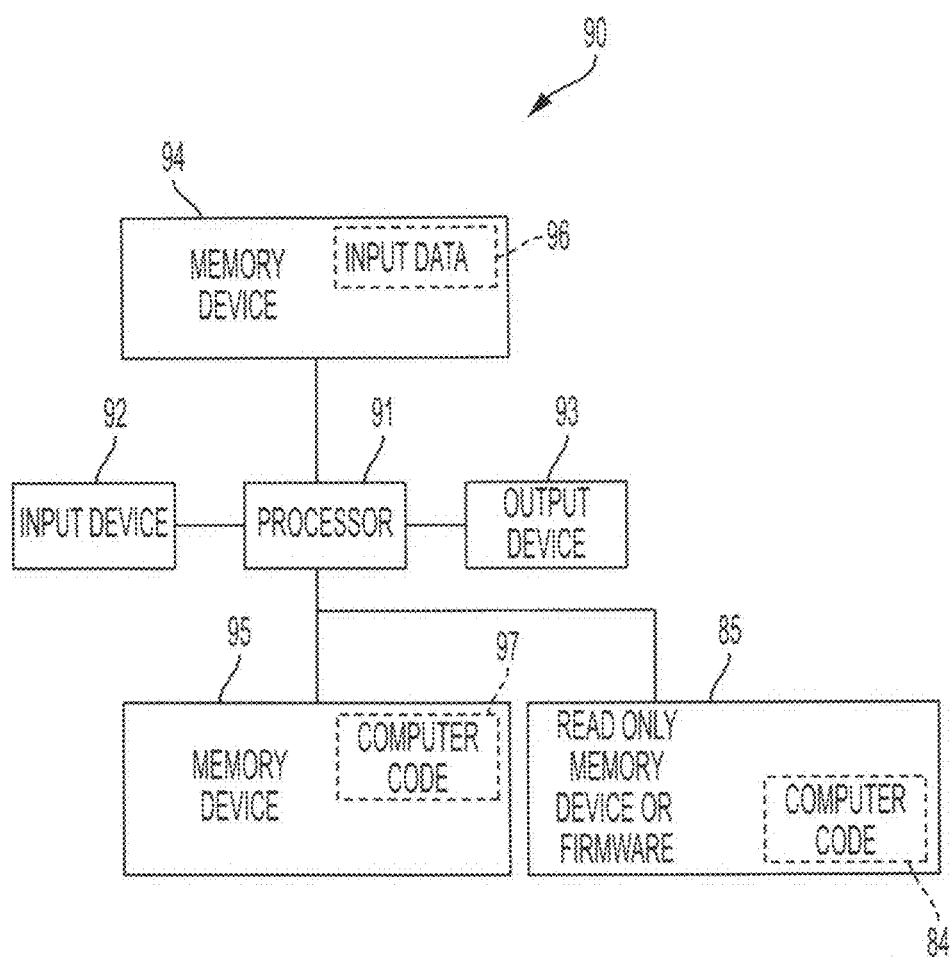
FIG. 6 illustrates a computer system used by the system of FIG. 1 for improving video and software technology associated with extracting from a video stream and categorizing, skeleton points associated with a video representation of a user executing user movement actions; generating initial visual windows surrounding a group of skeleton points; extracting and linking feature vectors with point coordinates; and enabling the video stream with respect to video action recognition associated with accurate presentation, in accordance with embodiments of the present invention.

FIG. 6 illustrates a computer system 90 (e.g., hardware device 139 and video hardware 114 of FIG. 1) used by or comprised by the system 100 of FIG. 1 for improving video and software technology associated with extracting from a video stream and categorizing, skeleton points associated with a video representation of a user executing user movement actions; generating initial visual windows surrounding a group of skeleton points; extracting and linking feature vectors with point coordinates; and enabling the video stream with respect to video action recognition associated with accurate presentation, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 6 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for improving video and software technology associated with extracting from a video stream and categorizing, skeleton points associated with a video representation of a user executing user movement actions; generating initial visual windows surrounding a group of skeleton points; extracting and linking feature vectors with point coordinates; and enabling the video stream with respect to video action recognition associated with accurate presentation. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve video and software technology associated with extracting from a video stream and categorizing, skeleton points associated with a video representation of a user executing user movement actions; generating initial visual windows surrounding a group of skeleton points; extracting and linking feature vectors with point coordinates; and enabling the video stream with respect to video action recognition associated with accurate presentation. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving video and software technology associated with extracting from a video stream and categorizing, skeleton points associated with a video representation of a user executing user movement actions; generating initial visual windows surrounding a group of skeleton points; extracting and linking feature vectors with point coordinates; and enabling the video stream with respect to video action recognition associated with accurate presentation. In another embodiment, the invention provides a business method that performs the process steps of the invention on a subscription, advertising, and/or fee basis. That is, a service supplier, such as a Solution Integrator, could offer to enable a process for improving video and software technology associated with extracting from a video stream and categorizing, skeleton points associated with a video representation of a user executing user movement actions; generating initial visual windows surrounding a group of skeleton points; extracting and linking feature vectors with point coordinates; and enabling the video stream with respect to video action recognition associated with accurate presentation. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
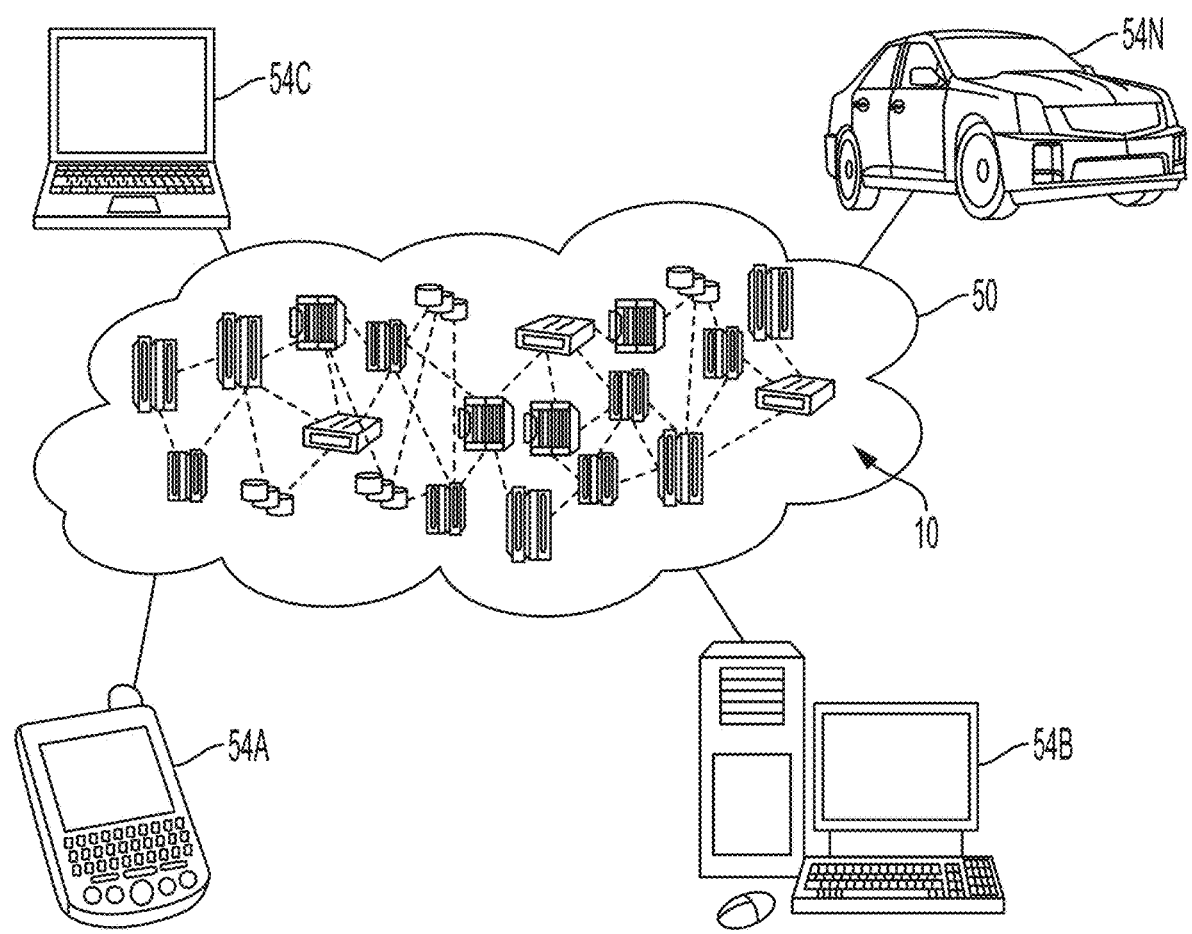
FIG. 7 illustrates a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 12 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (see FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and for improving video and software technology associated with extracting from a video stream and categorizing, skeleton points associated with a video representation of a user executing user movement actions; generating initial visual windows surrounding a group of skeleton points; extracting and linking feature vectors with point coordinates; and enabling the video stream with respect to video action recognition associated with accurate presentation 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A hardware device comprising a processor coupled to a computer-readable memory unit, said memory unit comprising instructions that when executed by the processor implements a video action recognition and modification method comprising:
   receiving, by said processor, a video stream comprising user movement actions;
   extracting, by said processor from said video stream via a plurality of sensors, skeleton points associated with a video representation of a user executing said user movement actions;
   categorizing, by said processor, said skeleton points with respect to multiple digital levels;
   generating, by said processor, initial visual windows surrounding a group of skeleton points of said skeleton points within a plurality of video frames of said video stream;
   determining, by said processor, an average movement distance for said group of skeleton points with respect to said plurality of video frames;
   adjusting, by said processor in response to results of said determining, sizes for said visual windows with respect to each of said plurality of video frames;
   extracting, by said processor executing scale-invariant feature transform (SIFT) code in response to results of said adjusting, feature vectors of said group of skeleton points;
   extracting, by said processor executing Open Pose code, point coordinates of said skeleton points;
   first linking, by said processor, said feature vectors with said point coordinates;
   generating, by said processor, a convolutional neural network associated with said linking said feature vectors with said point coordinates; and
   enabling, by said processor in response to results of enabling said convolutional neural network, said video stream with respect to video action recognition associated with accurate presentation of said video stream.

2. The hardware device of claim 1, wherein said method further comprises:
   extracting, by said processor, surrounding features associated with said skeleton points, wherein said determining said average movement distance for said group of skeleton points is further based on said surrounding features.

3. The hardware device of claim 1, wherein said method further comprises:
   categorizing, by said processor, said skeleton points with respect to multiple digital features; and
   second linking, by said processor, said multiple digital features.

4. The hardware device of claim 3, wherein said method further comprises:

determining, by said processor in response to results of said first linking and said second linking, a classification probability associated with actions of said convolutional neural network.

5. The hardware device of claim 1, wherein said determining said average movement distance comprises executing:

$$r_w^i = \frac{1}{N}\sum_{k=i-4}^{i+5} dist(x^t, x^{t+1}),$$

wherein $r_w^i$ comprises a reshape factor for an original window width (W) of an ith frame, wherein N comprises a number of frames for calculating a reshape factor, wherein dist comprises a Euclid distance, and wherein $x^t$ comprises x coordinates of skeleton points in a frame t.

6. The hardware device of claim 5, wherein said determining said average movement distance further comprises executing $$r_H^i = \frac{1}{N}\sum_{k=i-4}^{i+5} dist(y^t, y^{t+1}),$$

wherein $r^i$ comprises a reshape factor for an original window Height (H) of the ith frame, wherein N comprises a number of frames for calculating the reshape factor, wherein dist comprises a Euclid distance, and wherein $y^t$ comprises y coordinates of skeleton points in the frame t.

7. The hardware device of claim 1, wherein said adjusting said sizes for said visual windows comprises executing $$W' = W \times \frac{1}{1+e^{-r_w^i}},$$

wherein W' comprises a reshaped window width, wherein W comprises an original window width, and wherein $r_w^i$ comprises a reshape factor for the original window width W of an ith frame.

8. The hardware device of claim 7, wherein said adjusting said sizes for said visual windows further comprises executing $$H' = H \times \frac{1}{1+e^{-r_H^i}},$$

wherein H' comprises a reshaped window height, wherein H comprises an original window height, and wherein $r_H^i$ comprises a reshape factor for the original window width H of the ith frame.

9. The hardware device of claim 1, wherein said method further comprises:
   up sampling, by said processor, said skeleton points to said multiple digital levels.

10. A video action recognition and modification method comprising:
   receiving, by a processor of a hardware device, a video stream comprising user movement actions;
   extracting, by said processor from said video stream via a plurality of sensors, skeleton points associated with a video representation of a user executing said user movement actions;

categorizing, by said processor, said skeleton points with respect to multiple digital levels;
generating, by said processor, initial visual windows surrounding a group of skeleton points of said skeleton points within a plurality of video frames of said video stream;
determining, by said processor, an average movement distance for said group of skeleton points with respect to said plurality of video frames;
adjusting, by said processor in response to results of said determining, sizes for said visual windows with respect to each of said plurality of video frames;
extracting, by said processor executing scale-invariant feature transform (SIFT) code in response to results of said adjusting, feature vectors of said group of skeleton points;
extracting, by said processor executing Open Pose code, point coordinates of said skeleton points;
first linking, by said processor, said feature vectors with said point coordinates;
generating, by said processor, a convolutional neural network associated with said linking said feature vectors with said point coordinates; and
enabling, by said processor in response to results of enabling said convolutional neural network, said video stream with respect to video action recognition associated with accurate presentation of said video stream.

11. The method of claim 10, further comprising:
extracting, by said processor, surrounding features associated with said skeleton points, wherein said determining said average movement distance for said group of skeleton points is further based on said surrounding features.

12. The method of claim 10, further comprising:
categorizing, by said processor, said skeleton points with respect to multiple digital features; and
second linking, by said processor, said multiple digital features.

13. The method of claim 12, further comprising:
determining, by said processor in response to results of said first linking and said second linking, a classification probability associated with actions of said convolutional neural network.

14. The method of claim 10, wherein said determining said average movement distance comprises executing:

$$r_w^i = \frac{1}{N}\sum_{t=i-4}^{i+5} dist(x^t, x^{t+1}),$$

wherein $r_w^i$ comprises a reshape factor for an original window width (W) of an ith frame, wherein N comprises a number of frames for calculating a reshape factor, wherein dist comprises a Euclid distance, and wherein $x^t$ comprises x coordinates of skeleton points in a frame t.

15. The method of claim 14, wherein said determining said average movement distance further comprises executing:

$$r_H^i = \frac{1}{N}\sum_{t=i-4}^{i+5} dist(y^t, y^{t+1}),$$

wherein $r^i$ comprises a reshape factor for an original window Height (H) of the ith frame, wherein N comprises a number of frames for calculating the reshape factor, wherein dist comprises a Euclid distance, and wherein $y^t$ comprises y coordinates of skeleton points in the frame t.

16. The method of claim 10, wherein said adjusting said sizes for said visual windows comprises executing $$W' = W \times \frac{1}{1+e^{-r_w^i}},$$

wherein W' comprises a reshaped window width, wherein W comprises an original window width, and wherein $r_w^i$ comprises a reshape factor for the original window width W of an ith frame.

17. The method of claim 16, wherein said adjusting said sizes for said visual windows further comprises executing $$H' = H \times \frac{1}{1+e^{-r_H^i}},$$

wherein H' comprises a reshaped window height, wherein H comprises an original window height, and wherein $r_H^i$ comprises a reshape factor for the original window width H of the ith frame.

18. The method of claim 10, further comprising:
up sampling, by said processor, said skeleton points to said multiple digital levels.

19. The method of claim 10, further comprising:
providing at least one support service for at least one of creating, integrating, hosting, maintaining, and deploying computer-readable code in the hardware device, said code being executed by the processor to implement: said receiving, said extracting said skeleton points, said categorizing, said generating said initial visual windows, said determining, said adjusting, said extracting said feature vectors, said extracting said point coordinates, said first linking, said generating said convolutional neural network, and said enabling.

20. A computer program product, comprising a computer readable hardware storage device storing a computer readable program code, said computer readable hardware storage device not being a transitory signal, said computer readable program code comprising an algorithm that when executed by a processor of a hardware device implements a video action recognition and modification method, said method comprising:
receiving, by said processor, a video stream comprising user movement actions;
extracting, by said processor from said video stream via a plurality of sensors, skeleton points associated with a video representation of a user executing said user movement actions;
categorizing, by said processor, said skeleton points with respect to multiple digital levels;
generating, by said processor, initial visual windows surrounding a group of skeleton points of said skeleton points within a plurality of video frames of said video stream;
determining, by said processor, an average movement distance for said group of skeleton points with respect to said plurality of video frames;
adjusting, by said processor in response to results of said determining, sizes for said visual windows with respect to each of said plurality of video frames;

extracting, by said processor executing scale-invariant feature transform (SIFT) code in response to results of said adjusting, feature vectors of said group of skeleton points;

extracting, by said processor executing Open Pose code, point coordinates of said skeleton points;

first linking, by said processor, said feature vectors with said point coordinates;

generating, by said processor, a convolutional neural network associated with said linking said feature vectors with said point coordinates; and enabling, by said processor in response to results of enabling said convolutional neural network, said video stream with respect to video action recognition associated with accurate presentation of said video stream.

* * * * *